United States Patent [19]
Gluntz et al.

[11] Patent Number: 5,596,613
[45] Date of Patent: Jan. 21, 1997

[54] PRESSURE SUPPRESSION CONTAINMENT SYSTEM FOR BOILING WATER REACTOR

[75] Inventors: Douglas M. Gluntz; Loyd B. Nesbitt, both of San Jose, Calif.

[73] Assignee: General Electric Company, San Jose, Calif.

[21] Appl. No.: 402,458

[22] Filed: Mar. 10, 1995

[51] Int. Cl.⁶ .................................................. G21C 9/008
[52] U.S. Cl. ........................ 376/283; 376/309; 376/314
[58] Field of Search .................................. 376/283, 299, 376/309, 314

[56] References Cited

U.S. PATENT DOCUMENTS

| 3,848,067 | 11/1974 | Cooper | 376/314 |
| 3,963,460 | 6/1976 | Stumpf et al. | 376/314 |
| 5,091,144 | 2/1992 | Dillmann et al. | 376/283 |
| 5,295,168 | 3/1994 | Gluntz et al. | 376/283 |

FOREIGN PATENT DOCUMENTS

| 59-184887 | 10/1984 | Japan | 376/283 |
| 60-31091 | 2/1985 | Japan | 376/283 |
| 61-70492 | 4/1986 | Japan | 376/283 |
| 64-21393 | 1/1989 | Japan | 376/283 |
| 2-98689 | 4/1990 | Japan | 376/283 |
| 3-235093 | 10/1991 | Japan | 376/283 |

OTHER PUBLICATIONS

Standard Safety Analysis Report, ABWR (no date).

*Primary Examiner*—Daniel D. Wasil
*Attorney, Agent, or Firm*—James E. McGinness

[57] ABSTRACT

A system for suppressing the pressure inside the containment of a BWR following a postulated accident. A piping subsystem is provided which features a main process pipe that communicates the wetwell airspace to a connection point downstream of the guard charcoal bed in an offgas system and upstream of the main bank of delay charcoal beds which give extensive holdup to offgases. The main process pipe is fitted with both inboard and outboard containment isolation valves. Also incorporated in the main process pipe is a low-differential-pressure rupture disk which prevents any gas outflow in this piping whatsoever until or unless rupture occurs by virtue of pressure inside this main process pipe on the wetwell airspace side of the disk exceeding the design opening (rupture) pressure differential. The charcoal holds up the radioactive species in the noncondensable gas from the wetwell plenum by adsorption, allowing time for radioactive decay before the gas is vented to the environs.

12 Claims, 3 Drawing Sheets

PRESSURE SUPPRESSION CONTAINMENT SYSTEM FOR BOILING WATER REACTOR

The Government of the United States of America has rights in this invention in accordance with Contract No. DE-AC03-90SF18494 awarded by the Department of Energy.

FIELD OF THE INVENTION

This invention relates generally to containment systems installed on nuclear power stations to prevent releases to the environment of radioactive byproducts generated within the nuclear reactors of such power stations and first released outside the reactor primary coolant system pressure boundary which has become breached as a result of certain system accidents that have exceeded in severity the design basis pressure integrity for the primary coolant system. In particular, the invention relates to passive systems applied to boiling water reactors (BWRs) for suppressing the pressure inside the containment following a postulated accident.

BACKGROUND OF THE INVENTION

BWRs have conventionally utilized active safety systems to control and mitigate accident events. Those events varied from small break to design basis accidents. Passive safety systems have been studied for use in simplified BWRs (SBWRs) because of their merits in reducing specialized maintenance and surveillance testing of the safety-related equipment, and in eliminating the need for AC power, thereby improving the reliability of essential safety system responses necessary for the control and mitigation of adverse effects produced by accidents. SBWRs can additionally be designed with certain passive safety features that provide more resistance to human error in accident control and mitigation.

Referring to FIG. 1, an SBWR includes a reactor pressure vessel 10 containing a nuclear reactor fuel core 12 submerged in water 14. The fuel core heats the water to generate steam 14a which is discharged from the reactor pressure vessel through a main steam line 16 and used to power a steam turbine-generator for producing electrical power.

The reactor pressure vessel is surrounded by a containment vessel 18. The volume inside containment vessel 18 and outside reactor pressure vessel 10 is called the drywell 20. The containment vessel is a concrete structure having a steel liner and is designed to withstand elevated pressure inside the drywell. The drywell typically contains a noncondensable gas such as nitrogen.

In accordance with the conventional SBWR containment design, an annular suppression or wetwell pool 22 surrounds the reactor pressure vessel within the containment vessel. The suppression pool is partially filled with water 24 to define a wetwell airspace or plenum 26 thereabove. The suppression pool 22 serves various functions including being a heat sink in the event of certain accidents. For example, one type of accident designed for is a loss-of-coolant accident (LOCA) in which steam from the reactor pressure vessel 10 leaks into the drywell 20. Following the LOCA, the reactor is shut down but pressurized steam and residual decay heat continue to be generated for a certain time following the shutdown. Steam escaping into the drywell 20 is channeled into the suppression pool 22 through a multiplicity of (e.g., eight) vertical flow channels, each flow channel 27 having plurality of (e.g., three) horizontal vents 28. Steam channeled into the suppression pool 22 through the vents 28 carries with it portions of the drywell noncondensable gas 30. The steam is condensed and the noncondensable gas 30 is buoyed upwardly to the wetwell plenum 26, where it accumulates.

When the pressure in wetwell plenum 26 exceeds that in drywell 20, one or more vacuum breakers 36, which penetrate the wetwell wall, are opened to allow noncondensable gas 30 in the wetwell plenum 26 to vent to the drywell 20. The vacuum breakers 36 remain closed when the pressure in drywell 20 is equal to or greater than the pressure in the wetwell plenum 26.

The system further includes one or more gravity-driven cooling system (GDCS) pools 38 located above the suppression pool 22 within the containment vessel 18. The GDCS pool 38 is partially filled with water 42 to define a GDCS plenum 44 thereabove. The GDCS pool 38 is connected to an outlet line 46 having a valve 48 which is controlled by controller 40. The valve 48 is opened to allow GDCS water 42 to drain by gravity into pressure vessel 10 for cooling the core following a LOCA. Steam and noncondensable gas can be channeled directly into the GDCS plenum 44 from the drywell 20 via an inlet 50. An optional condenser or heat exchanger 72 may be provided for condensing steam channeled through inlet 50 following draining of the GDCS water 42 for drawing in additional steam and noncondensable gas.

The suppression pool 22 is disposed at an elevation which is above the core 12 and is connected to an outlet line 32 having a valve 34 which is controlled by a controller 40. The valve 34 is opened after an appropriate time delay from the opening of valve 48 to allow wetwell water 24 to also drain by gravity into the pressure vessel 10 for cooling the core following a LOCA.

In the SBWR design, a passive containment cooling system (PCCS) is provided for removing heat from the containment vessel 18 during a LOCA. A condenser pool 52, configured as a collection of subpools (not shown) interconnected so as to act as a single common large pool, is disposed above the containment vessel 18 and above the GDCS pool 38. The condenser pool 52 contains a plurality of PCC heat exchangers 54 (only one of which is shown in FIG. 1), also commonly referred to as PCC condensers, submerged in isolation water 56. The condenser pool 52 includes one or more vents 58 to atmosphere outside the containment for venting the airspace above the condenser pool water 56 for discharging heat therefrom upon use of the PCC heat exchanger 54.

The PCC heat exchanger 54 has an inlet line 60 in flow communication with the drywell 20 and an outlet line 62 joined to a collector chamber 64 from which a vent pipe 66 extends into the suppression pool 22 and a condensate return conduit 68 extends into the GDCS pool 38. The PCC heat exchanger 54 provides passive heat removal from the drywell 20 following the LOCA, with steam released into the drywell flowing through inlet 60 into the PCC heat exchanger wherein it is condensed. The noncondensable gas (e.g., nitrogen) within the drywell is carried by the steam into the PCC heat exchanger and must be separated from the steam to provide effective operation of the PCC heat exchanger. The collector chamber 64 separates the noncondensable gas from the condensate, with the separated noncondensable gas being vented into the suppression pool 22, and the condensate being channeled into the GDCS pool 38. A water trap or loop seal 70 is provided at the end of condensate return conduit 68 in GDCS pool 38 to restrict backflow of heated fluids from GDCS pool 38 to suppression pool 22 via the condensate return conduit 68, which would bypass PCC heat exchanger 54.

Accordingly, this system is configured to transport the noncondensable gas from the drywell 20 to the wetwell plenum 26 and then condense steam from the drywell in the PCC heat exchanger 54. The noncondensable gas will remain in the enclosed wetwell until the PCC heat exchanger 54 condenses steam faster than it is released from the reactor pressure vessel. When this occurs, the PCC heat exchanger lowers the drywell pressure below that of the wetwell, which causes the vacuum breakers 36 to open, thereby allowing noncondensable gas stored in the wetwell to return to the drywell.

Furthermore, the noncondensable gas within the drywell is also carried directly into the wetwell by the escaping steam which is channeled through horizontal vents 28. The steam is released underwater in the wetwell and condenses therein, while the noncondensable gas is buoyed upwardly through the pool water to vent into the enclosed wetwell air chamber disposed above the pool water, where the noncondensable gas is retained. As the noncondensable gas accumulates in the wetwell chamber, the pressure therein increases correspondingly. Accordingly, the overall containment pressure remains relatively high after the LOCA due to the high-pressure steam escaping into the drywell, and the wetwell pressure also remains high due to the accumulation of noncondensable gas. The consequences of post-LOCA elevated pressure levels obviously lead to requirements for robustness of the containment structures which must be provided to resist and contain these pressures, and in turn lead to high nuclear plant capital costs through extensive and sophisticated, costly, structural design and construction practices, premium-priced construction materials, and still other consequences which translate into elevated costs for nuclear power plants.

SUMMARY OF THE INVENTION

The present invention is an improved system for suppressing the pressure inside the containment of a BWR following a postulated accident. It is an objective of the invention to mitigate the extent of pressure rise developed in these containments following a postulated LOCA and to thereby derive benefits of either lower plant costs, improved safety margins, improved customer and/or regulating authority product acceptance, possibly faster plant construction schedules, or an optimized combination of such benefits.

In accordance with a preferred embodiment of the invention, a piping subsystem of apt size is provided which features a main process pipe that communicates the wetwell airspace to an apt connection point in the existing offgas system commonly provided in BWR nuclear power stations and provided in improved design (see FIG. 1) of the SBWR. This connection point is preferably downstream of the guard bed in the SBWR offgas system and upstream of the main bank of charcoal beds which give extensive holdup to offgases. The main process pipe of the piping system in accordance with the present invention is fitted with both inboard and outboard containment isolation valves. Also incorporated in the main process pipe is a low-differential-pressure (typically, 10 psid) rupture disk which prevents any gas outflow in this piping whatsoever until or unless rupture occurs by virtue of pressure inside this main process pipe on the wetwell airspace side of the disk exceeding the design opening (rupture) pressure differential.

In normal plant power generation service, this piping subsystem is operated with both containment isolation valves in the normally-open position, and with the rupture disk intact, that is, unbroken. If a LOCA occurs, steam and drywell noncondensables are caused, through well-known processes of the pressure suppression containment concept, to issue to a discharge point underwater in the suppression pool. The steam is condensed, while the noncondensables rise through the pool water to collect in the wetwell airspace, thus raising the wetwell pressure. It is a characteristic of these designs that little, if any, radioactivity will be carried into the wetwell airspace because of the well-known processes of pool scrubbing, said radioactive constituents remaining trapped in the suppression pool water.

When the wetwell pressure rises (in the seconds following the postulated LOCA break) above the design differential pressure of the subsystem's rupture disk, this disk will open (rupture), allowing drywell/wetwell noncondensables (normally, just nitrogen with a very small percentage of oxygen) together with a small water vapor component to flow out of the wetwell and to flow down the main process pipe into the charcoal tanks of the offgas system. (The normal operating pressure at this connection point in the offgas system is approximately 3 psig.) Here, the charcoal holds up the radioactive atomic species in the noncondensable gas by adsorption. Any small radioactivity (normally, such radioactivity would be just the noble gases, krypton and xenon) present in the gas issuing into the charcoal, being thus held up in time, experiences opportunity to undergo radioactive decay prior to these adsorbed gases migrating to sites farther downstream in the charcoal, ultimately to be released out the discharge of the charcoal tanks to an offgas system process pipe, releasing said gases to a plant stack or a high-elevation discharge point on the reactor plant site.

By the described action of releasing noncondensables from the wetwell, the post-LOCA peak pressure otherwise developed in the SBWR (or its European variant, the ESBWR) containment system is reduced. This is because at any point, once the wetwell gas release through the invention's subsystem process piping begins, fewer moles of gas will be present in the wetwell.

Such pressure reduction has many prospective benefits, including the following: (1) pressure differentials driving radioactivity through tiny containment-to-safety envelope leakage pathways is diminished, so untreated releases through this pathway to the environs are reduced; (2) designers may elect to reduce the design pressure of the containment, minimizing rebar and concrete, or minimizing steel thicknesses, necessary to achieve design pressure targets for the containment structure.

Later in the course of a LOCA, when or if elevated levels of radioactivity are detected by the process radiation monitors of the subsystem, signals are generated to close the containment isolation valves. This absolutely seals any such potentially harmful levels of radiation from passing outwardly from the wetwell via the offgas system to the environs.

The concept of the invention is fundamentally different, both in design and in manner of use, from any "post-LOCA containment venting schemes" which may have been previously developed.

In particular, the subsystem of the invention uses a relatively low-differential-pressure rupture disk (e.g., preferably about 10 psid) to initiate flow of containment atmosphere from the wetwell, whereas all other venting schemes based on either rupture disks or valves to accomplish release, are designed to cause such releases only after containment pressure begins to approach levels (e.g., typically 100 psid) where gross rupture of the containment itself is threatened.

Secondly, the subsystem of the invention retains all necessary characteristics to be qualified as a "passive" system in both its starting action as well as its "ending" action. No prior art scheme has addressed this aspect. For example, in existing designs, reactor operator action is relied upon to close vent valves once containment pressures are returned to acceptable levels. In contrast, the subsystem in accordance with the invention passively closes isolating-type valves only when a plausible threat condition, i.e., high radioactivity, is detected.

Thirdly, the manner of preferred system operation is to remove/vent containment noncondensables at the very outset of the containment wetwell pressurization transient, long before there is any chance of core fuel damage, and thus long before any threat of release of radioactivity outside the containment can possibly develop.

DETAILED DESCRIPTION OF THE PREFERRED EMBODIMENTS

Figure 1:
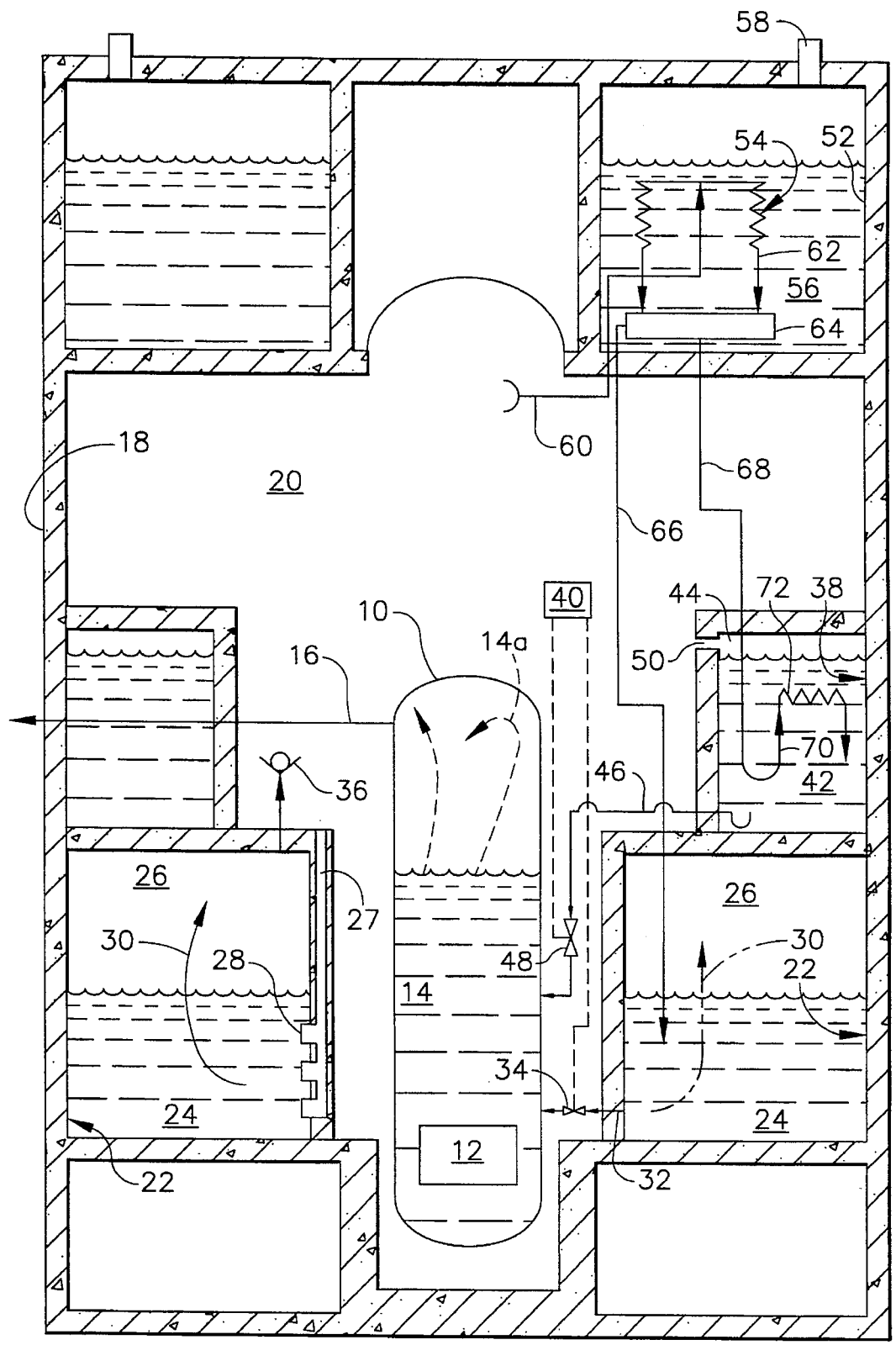
FIG. 1 is a schematic elevational sectional view of a nuclear reactor having a pressure suppression system in accordance with a known BWR design.
Figure 2:
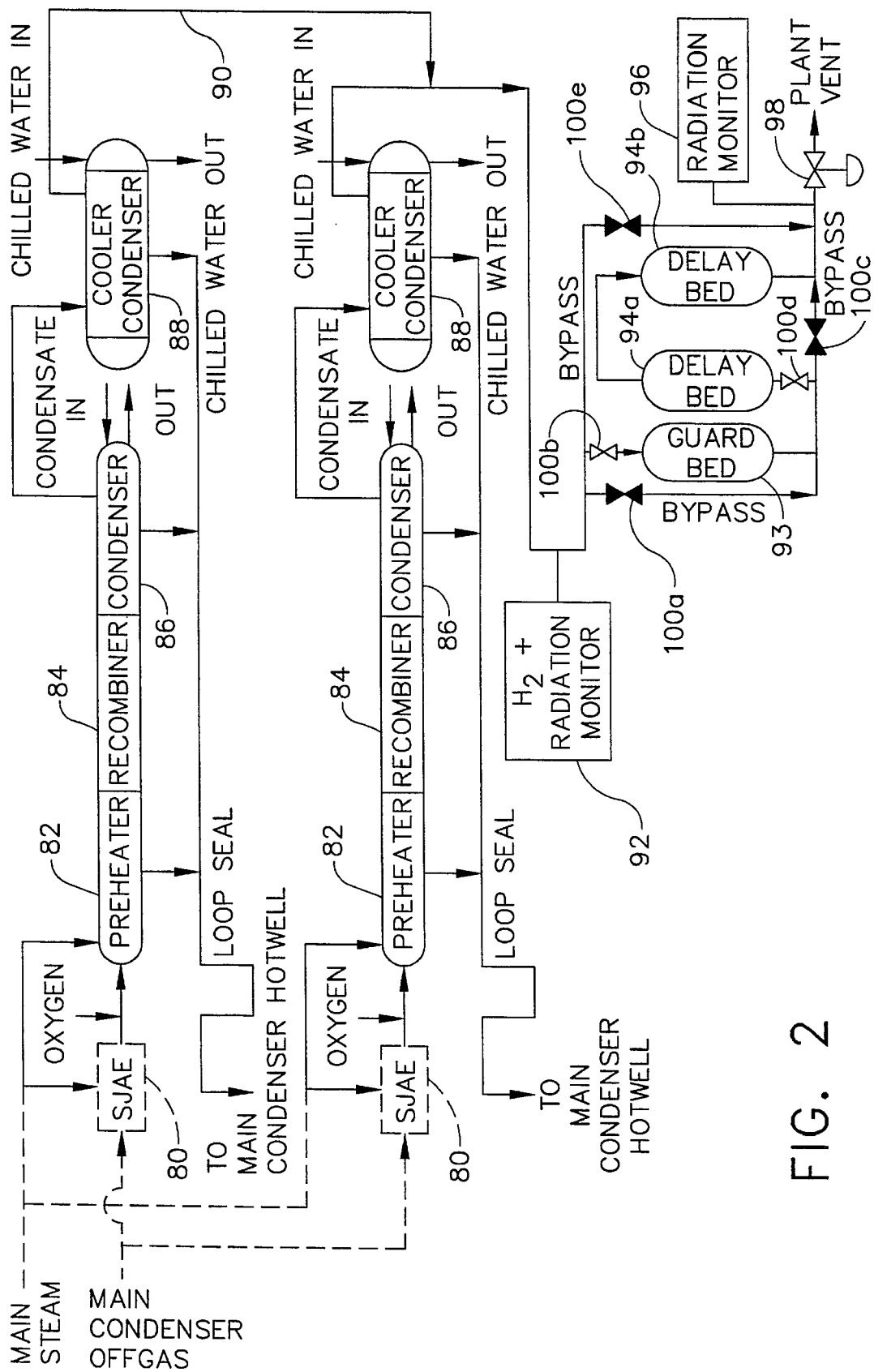
FIG. 2 is a block diagram of an offgas system for a BWR.

In accordance with the preferred embodiment of the present invention, the pressure inside the containment is reduced by venting the wetwell plenum to an appropriate connection point in the existing offgas system. As shown in FIG. 2, a conventional offgas system comprises two 100% recombiner trains. Generally, the two trains are not operated simultaneously, but rather one train is held in reserve as a backup system. Each train comprises a steam jet air ejector 80 which is connected to the main condenser chamber. The main condenser of a turbine has tubes through which cooling water flows. The tubes provide condensing action for expired steam whereby purified water condensate is recovered for recycling. The main condenser receives a continuous inflow of steam and runs at sub-atmospheric conditions. The main condenser almost produces a high degree of vacuum due to the pressure drop precipitated by condensation.

The steam entering the main condenser may have trace quantities of oxygen, hydrogen, argon, nitrogen, krypton, xenon, etc. These trace gases, unless removed, accumulate over time and tend to destroy the vacuum condition as noncondensable gases collect inside the main condenser. The steam jet air ejector takes steam from a turbine extraction stage upstream of the main condenser, or from an auxiliary steam boiler or from a re-boiler that has produced steam of apt pressure, and releases this motive steam through a jet pump nozzle, thereby sucking off noncondensable gas and some steam from suitable collection regions provided in the main condenser.

In the event that the nuclear fuel core of the reactor includes leaking fuel rods, radioactive fission products gases, such as krypton and xenon, will leak into the mixture of water and steam flowing out of the core and into the steam separators. Because of the potential for radioactive gases, such as krypton and xenon, to be present in the steam sent to the main condenser and in the offgas diverted therefrom, the offgas must be treated. Therefore, the mixture of noncondensable gas and steam plus added oxygen, if operating under hydrogen water chemistry conditions, is injected into a preheater 82, which heats the mixture to a higher temperature. The preheated mixture is then passed through a recombiner 84 loaded with catalytic material (e.g., a noble metal) which catalyzes the reformation of water molecules from hydrogen and oxygen molecules. This is done to avoid explosive levels of hydrogen and oxygen. The mixture then flows through condensers 86 and 88, which utilize cold water to condense the steam, leaving the noncondensable gas in a gaseous state. The condensed steam, now condensate, drains by gravity to the main condenser hotwell via a loop seal.

The noncondensable gas then flows along an outlet line 90, which is monitored by a hydrogen and radiation monitor 92. Depending on the radioactivity of the noncondensable gas as determined by monitor 92, the noncondensable gas is directed either through the bypass valve 100a or the guard bed 93, which is a large bed (typically 8 ft in diameter and 30 ft tall) filled with activated charcoal. If the level of radioactivity of the noncondensable gas is above a predetermined threshold, the bypass valve 100a is closed and inlet valve 100b is opened to allow the noncondensable gas to flow into guard bed 93. As noncondensable gas flows through the guard bed, the fission atomic species, e.g., krypton and xenon, are adsorbed by the charcoal and held up thereby. The krypton takes more than 2 days to pass through the guard bed, whereas the xenon takes more than 4 weeks. While the radioactive fission products are held up, they decay into less harmful products which can then be safely vented to the atmosphere. If the level of radioactivity is below the predetermined threshold, the by-pass valve is opened, the inlet valve 100b is closed and the bypass valve 100c is opened, which allows the noncondensable gas to be vented directly to the atmosphere via the plant vent 98.

Depending on the level of radioactivity, the discharge from the guard bed 93 can be directed either to the plant vent 98 via open bypass valve 100c (inlet valve 100d closed) or to the bank of delay beds 94, only two (94a and 94b) of which are depicted in FIG. 2. Each delay bed is a large bed (typically 6 ft in diameter and 20 ft tall), again filled with activated charcoal. Before reaching the plant vent 98, the noncondensable gas is monitored by a radiation monitor 96. If the level of radioactivity of the noncondensable gas is below the predetermined threshold while bypass valve 100c is open, then bypass valve 100c remains open. However, if the level of radioactivity of the noncondensable gas exiting the guard bed 93 is above the predetermined threshold, bypass valve 100c is closed, inlet valve 100d is opened and the flow of noncondensable gas is diverted to the bank 94 of delay beds for further treatment. The delay beds are connected in series, with each successive delay bed holding up the radioactive fission products and thereby providing additional time for radioactive decay. The total holdup times can be extended to any desired duration by passing the radioactive gas through a corresponding number of delay beds. The noncondensable gas is ultimately discharged from the last delay bed and carried to the plant vent for discharge into the atmosphere. Bypass valve 100e, shown closed in FIG. 2 (as are bypass valves 100a and 100c), is only opened during startup to prevent any latent steam in the gas flow from contaminating the charcoal beds.

Figure 3:
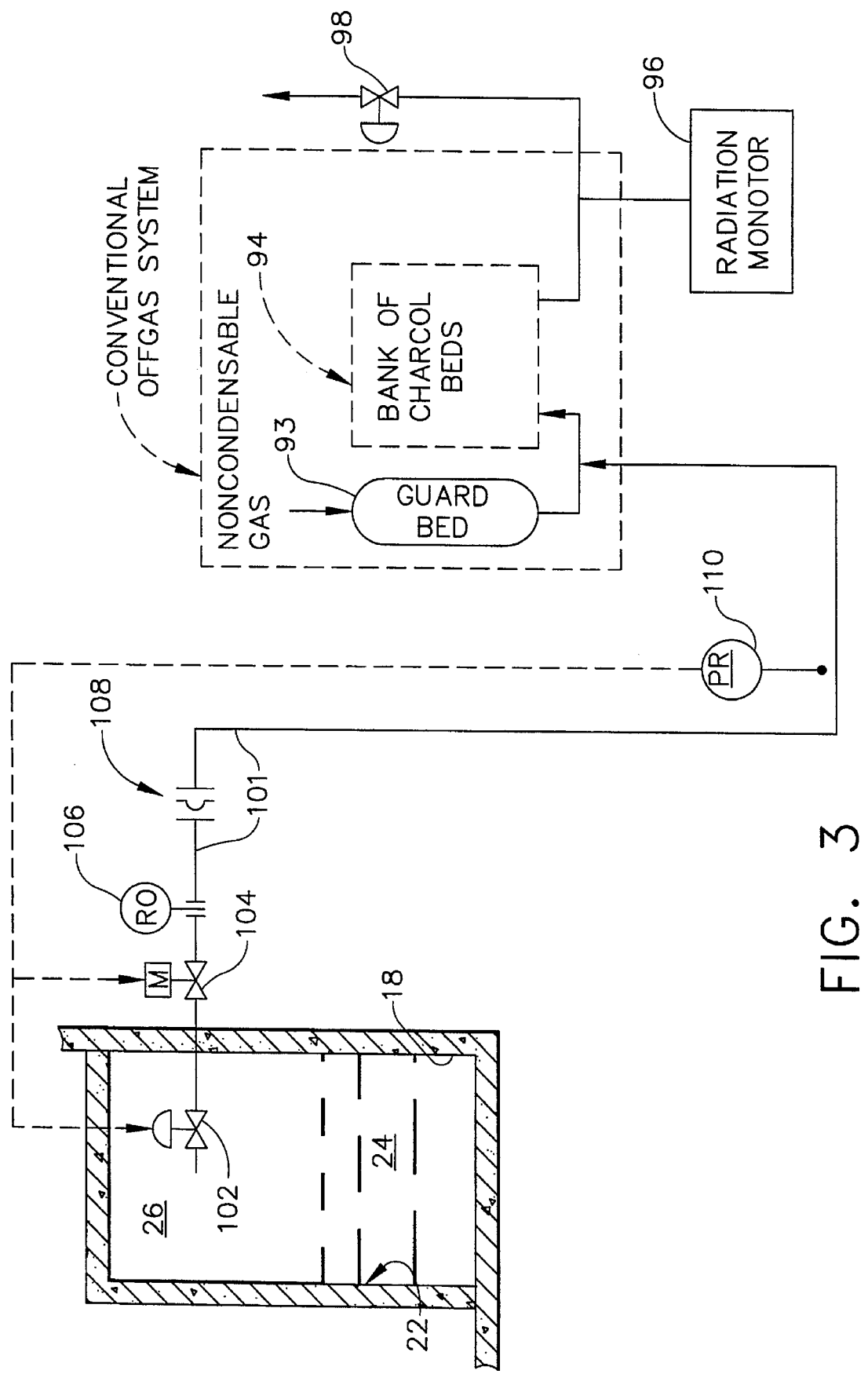
FIG. 3 is a schematic depiction of a pressure suppression subsystem in accordance with a preferred embodiment of the invention.

The preferred embodiment of the invention is a piping subsystem, shown in FIG. 3, which releases noncondensable gas from the wetwell plenum 26 and pipes into the delay beds 94 of the offgas system The piping system comprises a main process pipe that communicates the wetwell plenum 26 to a connection point downstream of the guard tank 93 in the offgas system and upstream of the main bank 94 of delay beds. Since the object is to provide extensive holdup to radioactive species in the noncondensable gas, it will be obvious that the connection point could, in the alternative, be upstream of the guard bed or between any two connected delay beds in the main bank 94.

The main process pipe 101 is fitted with both an inboard containment isolation valve 102 (preferably featuring a pneumatic-type valve operator) and also an outboard containment isolation valve 104 (preferably featuring a 125-volt DC motor type valve operator). Also incorporated in the main process pipe in accordance with the preferred embodiment is a low-differential-pressure (typically, 10 psid) rupture disk 108 which prevents any gas outflow in this piping whatsoever unless rupture occurs by virtue of pressure inside this main process pipe on the wetwell plenum 26 side of disk 108 exceeding the design opening (rupture) pressure differential.

Also, one or more restricting orifices 106 of apt size are provided at apt locations along the main process pipe 101 to limit the release rate of noncondensable gas from the wetwell plenum 26 as may be found desirable, depending on various considerations of the system design.

This pressure suppression subsystem also includes apt stored-energy type auxiliary power services (not shown) that will both passively allow closure of the isolation valves 102 and 104 if so signaled—e.g., via provision of a precharged pneumatic accumulator to "passively" power-close the inboard containment isolation valve 102, and connections to safety-grade DC battery power to "passively" power-close the outboard containment isolation valve 104 when signaled—as well as industry common auxiliary services to provide elective opening/closing of these valves for test purposes, or to allow isolation of the rupture disk 108 from excess wetwell pressure which might develop, for example, during containment leaktight integrity pressure testing.

The subsystem is further provided with apt controls and sensors, and the like, to meet the appropriate needs for proper responses during LOCAs, as well as routine plant operations including testing, maintenance, etc. A part of this complement of instrumentation includes one or more process radiation monitors 110, located at one or more apt points in the subsystem main process piping 101, which upon detection of radiation levels in excess of predetermined limits, will issue a signal which actuates the containment isolation valves 102 and 104, thereby preventing the release of such radioactivity to the environs.

The holdup action in the charcoal beds 94 is known to be a strong, and favorable, function of at least four parameters: (1) the total mass of the charcoal, (2) the atomic weight of the gas, (3) whether the gas is monatomic or diatomic, and (4) the ambient gas pressure which the charcoal is experiencing. For example, gases of light atomic weight and low boiling point (nitrogen, oxygen) pass through the charcoal rapidly. But the radioactive gases krypton and xenon, which have high atomic weight and are monatomic, are retained in the activated charcoal for vastly longer holdup times. This is a key (though not essential) benefit derived from choosing to discharge the gases released from the wetwell plenum through the relatively enormous mass of the charcoal beds.

The harmless gases are readily exhausted, while any potentially hazardous gases are retained for very long periods in the charcoal—a condition which is highly desirable.

Water vapor present in the released wetwell gas stream does have a tendency to "wet"—and render less effective—activated charcoal. For this reason, it is common practice in nuclear power station offgas systems based on charcoal for holdup action, to incorporate some form of water vapor removal of the process gas prior to its entry into the charcoal beds. The impact of this phenomenon on the expected resultant reduction in holdup times that would be experienced by the proposed configuration and operating mode have been studied, and it was found that the reduction in holdup times for krypton and xenon will be less than 10%—a wholly inconsequential amount—over the time period during which the subsystem of the present invention would be allowing release of significant quantities of the noncondensable gases (again, principally nitrogen, with a trace of oxygen) which are such important contributors to the post-LOCA containment pressure.

Note should also be made that the design pressure of the steel vessels comprising the charcoal tanks of the offgas system is typically 350 psig. This is sufficient to withstand any prospective elevated pressure loading caused during the LOCA and manifested down the main process pipe to the offgas system, for the peak wetwell pressure during a design basis accident in these containments is well below 55 psig.

The subsystem could be configured with multiple pipes leading from the wetwell airspace to the offgas system, to secure some benefits of redundancy and/or increased process flow capacity (although at perhaps higher capital cost).

The inboard containment isolation valve could be moved to a location on the main process piping outboard of the wetwell to improve accessibility for maintenance.

An alternative discharge for the effluent passing down the main process pipe of the subsystem could be directly to the environs instead of to the offgas system charcoal beds, if the speed of closure of isolation valves were made rapid enough to isolate flow to limit radioactivity actually released to acceptably small quantities.

Another alternative connection point for the downstream end of the main process pipe could be to the main condenser, since this component already provides means for moving noncondensables from the condenser into the offgas system and would be at an absolute pressure even below that in the offgas system.

Various alternatives for location, types, control responses, etc., of the subsystem instrumentation and controls can be used, as would be evident to one practiced in the (system engineering) art.

Water vapor removal, available in many alternative methods, could be applied to the process gas stream prior to its entry to the charcoal tanks.

The action upon detection of high or potentially high radioactivity releases to the environs could be to close a discharge valve just ahead of where the offgas process stream is released to the plant stack, as an alternative to closing the containment isolation valves. The prospective benefit in this alternative is that the charcoal can continue to uptake noncondensables from the wetwell due to its not-yet-fully-saturated state.

Suitable isolation, and timing thereof following a LOCA, for portions of the offgas system which normally lie upstream of the charcoal guard bed could be provided via controls and valves, which may be new or may already be present in any given offgas system, depending on design optimization and simple licensability considerations. This could prevent, for example, possibly unwanted migration of the wetwell gas into equipment in the turbine building of these plants.

The foregoing preferred embodiments have been disclosed for the purpose of illustration. Other variations and modifications will be apparent to persons skilled in the design of passive pressure suppression systems. All such variations and modifications are intended to be encompassed by the claims hereinafter.

We claim:

1. In a boiling water reactor comprising a containment vessel, a reactor pressure vessel surrounded by said containment vessel with a drywell therebetween, a nuclear fuel core arranged inside said reactor pressure vessel, a suppression pool arranged inside said containment vessel and partly filled with water to form a wetwell airspace overlying said water, a condenser pool of water arranged above said drywell, a condenser submerged in said condenser pool, a condenser inlet flow path for coupling steam from said drywell into said condenser, a first condenser outlet flow path for coupling steam and noncondensable gas from said condenser into said suppression pool, a main condenser located outside said containment vessel and connected to receive gas from the reactor pressure vessel after the gas has passed through a turbine located outside said containment vessel, an offgas treatment system for removing radioactive species from gas not condensed by said main condenser (hereinafter "offgas"), a conduit which penetrates a wall of said containment vessel, said conduit having an inlet which communicates with said wetwell airspace and having a rupture disk installed in a portion of said conduit located outside said containment vessel, whereby noncondensable gas is released from said wetwell airspace via said conduit in response to rupture of said rupture disk, the improvement wherein said conduit has an outlet which communicates with an inlet of said offgas treatment system.

2. The boiling water reactor as defined in claim 1, wherein said rupture disk ruptures when the pressure inside said wetwell airspace is about 10 psid.

3. The boiling water reactor as defined in claim 1, further comprising an isolation valve installed in said conduit at a location between said inlet and a portion of said conduit which penetrates said containment vessel.

4. The boiling water reactor as defined in claim 1, further comprising an isolation valve installed in said conduit at a location between said rupture disk and a portion of said conduit which penetrates said containment vessel.

5. The boiling water reactor as defined in claim 1, wherein said offgas treatment system has an outlet which communicates with a plant vent that discharges into the reactor environs.

6. The boiling water reactor as defined in claim 1, further comprising a radiation monitor coupled to said conduit at a location between said rupture disk and said conduit outlet.

7. The boiling water reactor as defined in claim 6, further comprising an isolation valve installed in said conduit at a location between said conduit inlet and said rupture disk, and means for closing said isolation valve in response to a signal from said radiation monitor indicating a level of radioactivity in the noncondensable gas exiting said wetwell airspace in excess of a predetermined threshold.

8. The boiling water reactor as defined in claim 1, wherein said offgas treatment comprises means for condensing condensable gas in said offgas to form condensation which separates from noncondensable gas in said offgas, and a first bed of material having the property of adsorbing radioactive species produced by nuclear fission in said nuclear fuel core, said first bed having inlet means in flow communication with said conduit via a first valve means for receiving noncondensable gas from said wetwell airspace and in flow communication with said offgas condensing means via a second valve means for receiving noncondensable gas from said main condenser.

9. The boiling water reactor as defined in claim 8, wherein said bed material comprises activated charcoal.

10. A method for preventing escape of radioactive fission gases into the environs of a boiling water reactor having a containment vessel, a reactor pressure vessel surrounded by said containment vessel with a drywell therebetween, a nuclear fuel core arranged inside said reactor pressure vessel, a main condenser located outside said containment vessel and connected to receive gas from the reactor pressure vessel after the gas has passed through a turbine located outside said containment vessel, and a suppression pool arranged inside said containment vessel, said suppression pool being partly filled with water to form a wetwell airspace overlying said water, said method comprising the steps of:

during normal reactor operation, condensing condensable gas included in offgas from the main condenser to form condensation which separates from noncondensable gas in said offgas and then forcing the noncondensable gas through a bed of material having the property of adsorbing radioactive species present in the noncondensable gas from said main condenser; and following a loss-of-coolant accident which causes the reactor to be shutdown, discharging noncondensable gas from said wetwell airspace into said bed of material in response to the pressure inside said wetwell airspace reaching a predetermined level.

11. The method as defined in claim 10, wherein said material is activated charcoal.

12. The method as defined in claim 10, further comprising the step of venting the noncondensable gas to the reactor environs after passage of the noncondensable gas through said bed of material.

* * * * *